(12) United States Patent
Zhu

(10) Patent No.: US 9,479,611 B2
(45) Date of Patent: Oct. 25, 2016

(54) METHOD, DEVICE, AND SYSTEM FOR IMPLEMENTING COMMUNICATION AFTER VIRTUAL MACHINE MIGRATION

(71) Applicant: Huawei Technologies Co., Ltd., Shenzhen, Guangdong (CN)

(72) Inventor: Guojun Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 14/081,780

(22) Filed: Nov. 15, 2013

(65) Prior Publication Data

US 2014/0074997 A1 Mar. 13, 2014

Related U.S. Application Data

(63) Continuation of application No. PCT/CN2011/084617, filed on Dec. 26, 2011.

(51) Int. Cl.
*G06F 15/16* (2006.01)
*H04L 29/08* (2006.01)
*H04L 12/931* (2013.01)
*G06F 9/50* (2006.01)
*H04L 29/12* (2006.01)
(Continued)

(52) U.S. Cl.
CPC ........... *H04L 67/34* (2013.01); *G06F 9/45558* (2013.01); *G06F 9/4856* (2013.01); *G06F 9/5027* (2013.01); *G06F 9/5077* (2013.01); *H04L 49/70* (2013.01); *H04L 61/2015* (2013.01); *H04L 61/2076* (2013.01); *H04L 61/2084* (2013.01); *G06F 2009/4557* (2013.01); *G06F 2009/45595* (2013.01)

(58) Field of Classification Search
USPC ........................................................ 709/217
See application file for complete search history.

(56) References Cited

U.S. PATENT DOCUMENTS 6,768,743 B1 7/2004 Borella et al.
6,973,086 B2 * 12/2005 Patil ........................ H04L 63/08
370/392

(Continued)

FOREIGN PATENT DOCUMENTS

CN 101827106 A 9/2010
CN 101876883 A 11/2010

(Continued)

OTHER PUBLICATIONS

Woundy et al., "Dynamic Host Configuration Protocol (DHCP) Leasequery," Network Working Group, Request for Comments: 4388, pp. 1-27, Internet Society, Reston, Virginia (Feb. 2006).

(Continued)

*Primary Examiner* — Alicia Baturay
(74) *Attorney, Agent, or Firm* — Leydig, Voit & Mayer, Ltd.

(57) ABSTRACT

The present disclosure provides a method, a device, and a system for implementing communication after virtual machine migration. The method includes: constructing, after migration of a virtual machine, a dynamic host configuration protocol request message carrying address information of the virtual machine after the migration; and sending the dynamic host configuration protocol request message to a switch, so that the switch establishes a binding relationship between the address information of the virtual machine after the migration and a port accessed by the virtual machine.

17 Claims, 9 Drawing Sheets

(51) Int. Cl.
*G06F 9/48* (2006.01)
*G06F 9/455* (2006.01)

(56) References Cited

U.S. PATENT DOCUMENTS

| | | | | |
|---|---|---|---|---|
| 7,139,818 | B1 * | 11/2006 | Kinnear, Jr. | H04L 29/12273 709/222 |
| 7,313,606 | B2 * | 12/2007 | Donahue | H04L 41/0806 709/220 |
| 7,653,063 | B2 * | 1/2010 | Ertemalp | H04L 12/4641 370/331 |
| 7,720,069 | B2 * | 5/2010 | Yang | H04L 29/12009 370/392 |
| 8,458,700 | B1 * | 6/2013 | Arrance | G06F 9/45558 718/1 |
| 8,694,654 | B1 * | 4/2014 | Kalusivalingam | 370/389 |
| 8,838,756 | B2 * | 9/2014 | Dalal | G06F 9/5077 709/203 |
| 2007/0162616 | A1 * | 7/2007 | Li | H04L 12/2859 709/245 |
| 2007/0280243 | A1 | 12/2007 | Wray et al. | |
| 2008/0163207 | A1 * | 7/2008 | Reumann | H04L 63/0263 718/1 |
| 2010/0182984 | A1 | 7/2010 | Herscovici et al. | |
| 2010/0214949 | A1 | 8/2010 | Smith et al. | |
| 2011/0119382 | A1 * | 5/2011 | Shaw, Jr. | G06F 11/3664 709/226 |
| 2011/0238816 | A1 | 9/2011 | Vohra et al. | |
| 2011/0255533 | A1 | 10/2011 | Gnanasekaran | |
| 2012/0110237 | A1 * | 5/2012 | Li | G06F 9/45558 711/6 |
| 2012/0243403 | A1 * | 9/2012 | Hu | H04L 61/103 370/217 |
| 2013/0024553 | A1 * | 1/2013 | Mittal | H04L 41/0893 709/222 |
| 2013/0132607 | A1 * | 5/2013 | Sinha | H04L 45/00 709/238 |
| 2013/0142079 | A1 * | 6/2013 | Barabash | H04L 41/0809 370/255 |
| 2013/0232492 | A1 * | 9/2013 | Wang | H04L 61/103 718/1 |
| 2013/0311991 | A1 * | 11/2013 | Li | H04L 61/103 718/1 |

FOREIGN PATENT DOCUMENTS

| | | |
|---|---|---|
| CN | 101876921 A | 11/2010 |
| CN | 101888387 A | 11/2010 |
| CN | 101951345 A | 1/2011 |
| CN | 102185774 A | 9/2011 |

OTHER PUBLICATIONS

Gu et al., "Policies and dynamic information migration in DCs," Network Working Group, pp. 1-31, Internet Society, Reston, Virginia (Jun. 25, 2011).

Li, "Discussion on adding migration bit in VDP," Slides 1-12 (Mar. 14, 2011).

* cited by examiner

METHOD, DEVICE, AND SYSTEM FOR IMPLEMENTING COMMUNICATION AFTER VIRTUAL MACHINE MIGRATION

CROSS-REFERENCE TO RELATED APPLICATIONS

This application is a continuation of International Patent Application No. PCT/CN2011/084617, filed on Dec. 26, 2011, which is hereby incorporated by reference in its entirety.

TECHNICAL FIELD

The present disclosure relates to the computer communication field, and in particular, to methods, devices, and systems for implementing communication after virtual machine migration.

BACKGROUND

Cloud computing is an Internet-based computing method, by which shared software and hardware resources and information may be provided for computers and other devices according to requirements. A virtualization technology, as a keystone of cloud computing, virtualizes one physical computer into multiple virtual machines (Virtual Machines, VMs), and provides, through a management system, capabilities for automatic deployment and fast provisioning of services, so that end users (tenants) may quickly and conveniently lease the virtual machines.

Because users have control rights over the virtual machines used by the users, cloud computing is also faced with some security problems while providing convenient and fast virtual machine services. For example, without permission, a user changes an Internet protocol (Internet Protocol, IP) address or a media access control (Media Access Control, MAC) address, causing a conflict and even network breakdown. Because a virtual machine accesses a network through a switch, to solve the foregoing problems, a binding relationship including an IP address and a MAC address of the virtual machine may be stored in the switch, thereby ensuring that only a legal user can access the network.

After migration of the virtual machine, the binding relationship including the IP address and MAC address of the virtual machine before the migration is still stored in the switch; as a result, the switch considers that messages sent by the virtual machine after the migration are invalid, and therefore discards the messages sent by the virtual machine after the migration, so that it is impossible to implement network access after the virtual machine migration and impossible to implement communication after the virtual machine migration.

SUMMARY

The following provides a brief description of the present disclosure in order to provide basic understandings about some aspects of the present disclosure. It should be understood that the brief description is not an exhaustive brief description of the present disclosure. The brief description is neither intended to determine a key or an important part of the present disclosure, nor intended to limit the scope of the present disclosure. Its purpose is only to provide some concepts in a simple form to serve as a preamble of the detailed description discussed later.

An embodiment of the present disclosure provides a method for implementing communication after virtual machine migration includes:

constructing, after migration of a virtual machine, a dynamic host configuration protocol request message including address information of the virtual machine after the migration; and sending the dynamic host configuration protocol request message to a switch, to enable the switch to establish a binding relationship between the address information of the virtual machine after the migration and a port accessed by the virtual machine;

where the address information includes an IP address and a MAC address.

A method for implementing communication after virtual machine migration includes:

receiving, by a switch after migration of a virtual machine, a dynamic host configuration protocol request message including address information of the virtual machine after the migration; and establishing, by the switch, a binding relationship between the address information of the virtual machine after the migration and a port accessed by the virtual machine;

where the address information includes an IP address and a MAC address.

An apparatus for implementing communication after virtual machine migration includes:

a constructing unit, configured to construct, after migration of a virtual machine, a dynamic host configuration protocol request message including address information of the virtual machine after the migration; and a sending unit, configured to send the dynamic host configuration protocol request message to a switch, to enable the switch to establish a binding relationship between the address information of the virtual machine after the migration and a port accessed by the virtual machine;

where the address information includes an IP address and a MAC address.

A switch for implementing communication after virtual machine migration includes:

a receiving unit, configured to receive, after migration of a virtual machine, a dynamic host configuration protocol request message including address information of the virtual machine after the migration; and a binding processing unit, configured to establish a binding relationship between the address information of the virtual machine after the migration and a port accessed by the virtual machine; where the address information includes an IP address and a MAC address.

A system for implementing communication after virtual machine migration includes:

an apparatus for implementing communication after virtual machine migration, configured to construct, after migration of a virtual machine, a dynamic host configuration protocol request message including address information of the virtual machine after the migration, and send the dynamic host configuration protocol request message to a switch; and the switch, configured to receive the dynamic host configuration protocol request message including the address information of the virtual machine after the migration, and establish a binding relationship between the address information of the virtual machine after the migration and a port accessed by the virtual machine; where the address information includes an IP address and a MAC address.

With the method, the device, and the system for implementing communication after virtual machine migration according to the embodiments of the present disclosure, a dynamic host configuration protocol request message including address information of the virtual machine after the migration is constructed, and the dynamic host configuration protocol request message is sent to a switch, so that the switch may establish a binding relationship between the address information of the virtual machine after the migration and a port accessed by the virtual machine, where the address information includes an IP address and a MAC address. Therefore, according to the binding relationship, the switch considers that messages sent by the virtual machine after the migration are valid, and processes the messages sent by the virtual machine after the migration, thereby implementing network access and communication after the virtual machine migration.

BRIEF DESCRIPTION OF DRAWINGS

To illustrate the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The exemplary embodiments of the present disclosure are hereinafter described with reference to accompanying drawings. For the purpose of clarity and brevity, not all features of practical embodiments are described in the specification. However, it should be understood that in the process of developing any one of such practical embodiments, many embodiment-specific decisions must be made, so that specific objectives of developers are achieved, and these decisions may vary according to different embodiments.

Figure 1:
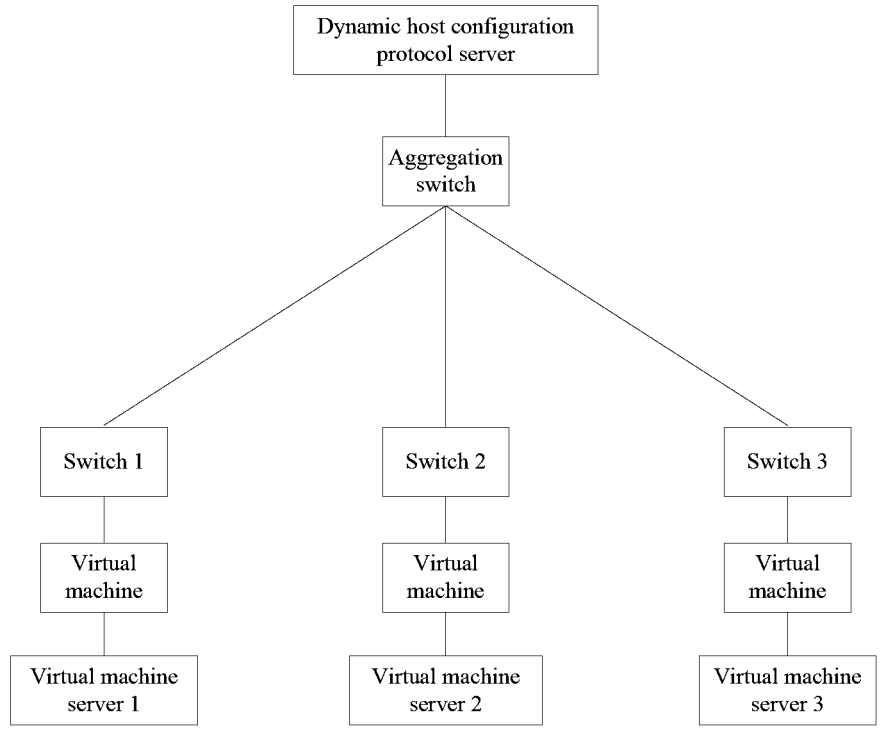
FIG. 1 is a diagram of a scenario according to an embodiment of the present disclosure.

An application scenario architecture of an embodiment of the present disclosure is shown in FIG. 1. To describe the implementation scenario of the embodiment of the present disclosure, FIG. 1 provides a typical application scenario architecture. FIG. 1 omits technical features that are irrelevant to the present disclosure, and also omits an information exchange procedure, but only provides an application scenario architecture. The present disclosure may be applied to the scenario shown in FIG. 1, but is not limited to the scenario. FIG. 1 is only intended to describe related embodiments of the present disclosure more clearly and is not intended to limit the application scope of the present disclosure. When a virtual machine migrates from virtual machine server 1 to virtual machine server 2, a binding relationship between address information (where the address information may include an IP address and a MAC address) of the virtual machine and an accessed port also needs to be updated from switch 1 to switch 2. The switch accessed by the virtual machine and the corresponding accessed port when the virtual machine accesses the switch also change, but the migration of the virtual machine does not trigger a dynamic host configuration protocol (Dynamic Host Configuration Protocol, DHCP) procedure. Therefore, in a case where the binding relationship between the address information (including the IP address and the MAC address) of the virtual machine and the accessed port is not updated, messages sent by the virtual machine after the migration are considered by the switch as invalid messages, so that it is impossible to implement normal communication.

A dynamic host configuration protocol procedure is usually as follows: A virtual machine sends a dynamic host configuration protocol discovery broadcast message (DHCP DISCOVER) to a dynamic host configuration protocol server, and if the virtual machine does not receive a response from the dynamic host configuration protocol server within a period of time, the virtual machine resends the DHCP DISCOVER to the dynamic host configuration protocol server. After receiving the dynamic host configuration protocol discovery message, the dynamic host configuration protocol server allocates resources to the virtual machine, and then sends a dynamic host configuration protocol OFFER message (DHCP OFFER). After receiving the DHCP OFFER, the virtual machine sends a dynamic host configuration protocol request message to the dynamic host configuration protocol server, request a lease from the server, and notifies other servers that the virtual machine has accepted the address allocated by the dynamic host configuration protocol server. The dynamic host configuration protocol server receives the dynamic host configuration protocol request message and verifies whether resources can be allocated. If resources can be allocated, the dynamic host configuration protocol server sends a dynamic host configuration protocol response to the virtual machine, or if resources cannot be allocated, the dynamic host configuration protocol server sends a dynamic host configuration protocol NAK message. The virtual machine receives the dynamic host configuration protocol response, and uses the resources allocated by the dynamic host configuration protocol server. If the dynamic host configuration protocol NAK message is received, the virtual machine resends the DHCP DISCOVER. All the messages exchanged above may be called dynamic host configuration protocol messages.

The switch performs analysis processing by intercepting dynamic host configuration protocol messages between the virtual machine and the dynamic host configuration protocol server, and may filter untrusted dynamic host configuration protocol messages and establish and maintain the binding relationship, where the binding relationship includes the address information of the virtual machine and the accessed port and so on, where the address information may include the IP address and the MAC address of the virtual machine.

However, in the scenario of migration of the virtual machine in a cloud environment, migration of the virtual machine is a process of copying a memory mirror. After the migration of the virtual machine, the switch accessed by the virtual machine and the corresponding accessed port when the virtual machine accesses the switch change, but a dynamic host configuration protocol procedure is not triggered. Therefore, in a case where the binding relationship between the address information of the virtual machine and the accessed port is not updated, messages sent by the virtual machine are considered by the switch as invalid messages, so that it is impossible to implement normal communication. To solve the problem, in the embodiment of the present disclosure, after migration of the virtual machine, a dynamic host configuration protocol request message carrying address information of the virtual machine after the migration is constructed, which is called a dynamic host configuration protocol request message, and is sent to the dynamic host configuration protocol server through the switch accessed by the virtual machine after the migration, for verification. In this case, the switch may allocate the accessed port to the virtual machine, and record the accessed port number allocated to the virtual machine. If verifying that the dynamic host configuration protocol request message is a valid message, the dynamic host configuration protocol server returns a dynamic host configuration protocol response message. The dynamic host configuration protocol response message carries the address information of the virtual machine after the migration. After receiving the dynamic host configuration protocol response message carrying the address information of the virtual machine after the migration, the switch obtains the address information of the virtual machine after the migration from the response message, generates a binding relationship according to the accessed port allocated by the switch to the virtual machine, as shown in Table 1, and uses the binding relationship to exclude invalid messages.

TABLE 1

| IP Address | MAC Address | Accessed Port Number |
|---|---|---|
| 10.85.28.193 | 00:e0:4c:97:6f:e8 | 24 |

The switch accessed by the virtual machine establishes a binding relationship between the address information corresponding to the virtual machine and the accessed port, as shown in Table 1. Table 1 is not intended to limit the binding relationship in the embodiment of the present disclosure, but is only intended to use a binding relationship for describing the embodiment of the present disclosure more clearly. All binding relationships between address information and accessed port, which can be implemented by a person skilled in the art, shall also fall within the protection scope of the present disclosure. The address information in the embodiment of the present disclosure may include but is not limited to an IP address and a MAC address. Other address information that can identify the virtual machine may also be used.

Figure 2A:
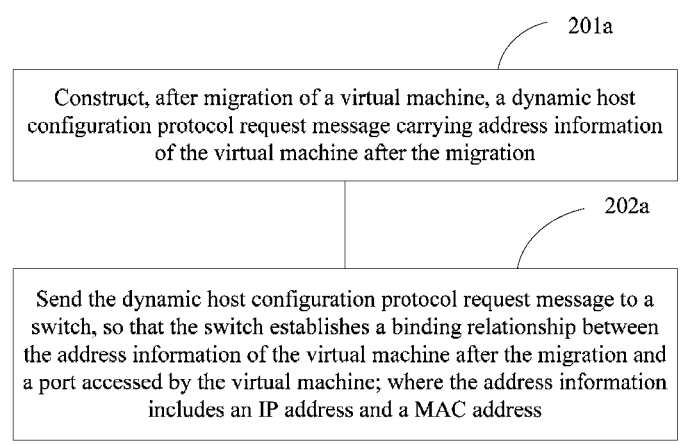
FIG. 2a is a schematic flowchart of a first embodiment of the present disclosure.

A first embodiment of the present disclosure provides a method for implementing communication after virtual machine migration. As shown in FIG. 2a, the method includes:

Step 201a: Construct, after migration of a virtual machine, a dynamic host configuration protocol request message carrying address information of the virtual machine after the migration.

Optionally, the dynamic host configuration protocol request message carrying the address information of the virtual machine after the migration is constructed after a virtual machine server or a virtual machine monitor detects the migration of the virtual machine.

Optionally, the dynamic host configuration protocol request message is a unicast renewal request message.

Step 202a: Send the dynamic host configuration protocol request message to a switch, so that the switch establishes a binding relationship between the address information of the virtual machine after the migration and a port accessed by the virtual machine; where the address information includes an IP address and a MAC address.

Optionally, the method may further include: receiving a dynamic host configuration protocol response message that is sent by the switch and carries the address information of the virtual machine after the migration; and updating, according to the dynamic host configuration protocol response message, a lease time of the IP address of the virtual machine after the migration.

In the embodiment of the present disclosure, after migration of the virtual machine, a dynamic host configuration protocol request message carrying address information of the virtual machine after the migration is constructed, and a binding relationship between the address information of the virtual machine after the migration and a port accessed by the virtual machine is established in the switch. Therefore, the switch can correctly identify messages sent by the virtual machine, and consider that the messages sent by the virtual machine after the migration are valid messages, thereby implementing normal communication after the virtual machine migration.

Figure 2B:
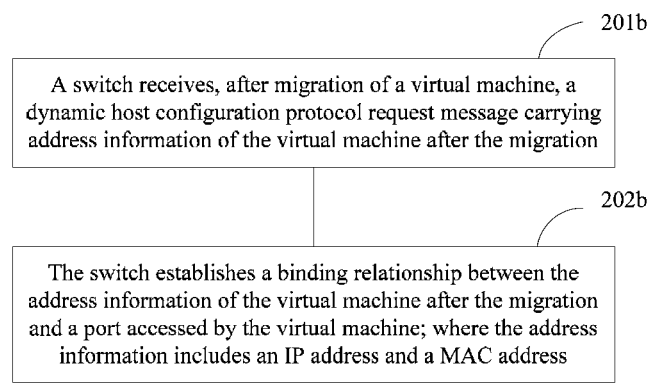
FIG. 2b is a schematic flowchart of a second embodiment of the present disclosure.

A second embodiment of the present disclosure provides a method for implementing communication after virtual machine migration. As shown in FIG. 2b, the method includes:

Step 201b: A switch receives, after migration of a virtual machine, a dynamic host configuration protocol request message carrying address information of the virtual machine after the migration.

Optionally, after the receiving the dynamic host configuration protocol request message, the method further includes:

sending the dynamic host configuration protocol request message to a dynamic host configuration protocol server, so that the dynamic host configuration protocol server verifies validity of the dynamic host configuration protocol request message;

after the verification succeeds, receiving a dynamic host configuration protocol response message that is returned by the dynamic host configuration protocol server and carries the address information of the virtual machine after the migration; and obtaining, from the dynamic host configuration protocol response message, the address information of the virtual machine after the migration.

Step 202*b*: The switch establishes a binding relationship between the address information of the virtual machine after the migration and a port accessed by the virtual machine; where the address information includes an IP address and a MAC address.

Optionally, after the receiving the dynamic host configuration protocol request message, the method further includes: obtaining the port accessed by the virtual machine; and the establishing the binding relationship between the address information of the virtual machine after the migration and the port accessed by the virtual machine specifically includes: establishing the binding relationship according to the address information of the virtual machine after the migration which is obtained from the dynamic host configuration protocol response message and the obtained port accessed by the virtual machine.

Further, before the obtaining the port accessed by the virtual machine, the method further includes: allocating, by the switch, the port accessed by the virtual machine to the virtual machine, and recording the port number accessed by the virtual machine; and the obtaining the port number accessed by the virtual machine specifically includes: obtaining, from the record, the port accessed by the virtual machine.

Optionally, in a case where a dynamic host configuration protocol relay exists, the dynamic host configuration protocol request message is sent to the dynamic host configuration protocol server through the dynamic host configuration protocol relay.

Optionally, the method further includes: sending, by the switch, the dynamic host configuration protocol response message carrying the address information of the virtual machine after the migration to a virtual machine server or a virtual machine monitor, so that a lease time of the IP address of the virtual machine after the migration is updated.

Optionally, the dynamic host configuration protocol request message is a unicast renewal request message.

The switch provided by the embodiment of the present disclosure receives a dynamic host configuration protocol request message carrying address information of the virtual machine after migration, and establishes a binding relationship between the address information of the virtual machine after the migration and a port accessed by the virtual machine. Therefore, the switch can correctly identify messages sent by the virtual machine, and consider that the messages sent by the virtual machine after the migration are valid messages, thereby implementing normal communication after the virtual machine migration.

Figure 3:
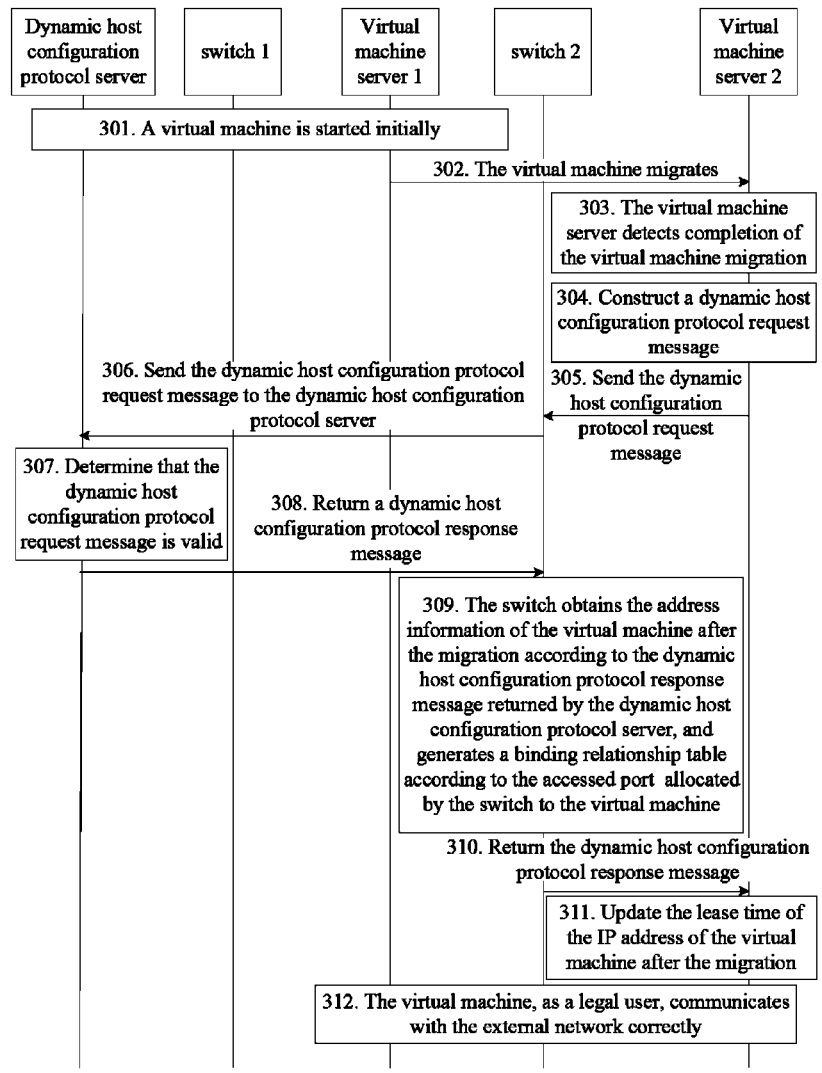
FIG. 3 is a schematic flowchart of a third embodiment of the present disclosure.

A third embodiment of the present disclosure provides a method for implementing communication after virtual machine migration. As shown in FIG. 3, the method includes:

Step 301: A virtual machine is started initially.

A dynamic host configuration protocol request procedure is initiated. A switch obtains address information of the virtual machine according to a dynamic host configuration protocol response message returned by a dynamic host configuration protocol server, and generates a binding relationship according to an accessed port allocated by the switch to the virtual machine, as shown in Table 1.

When the virtual machine is started, a complete IP address allocation procedure is initiated. After receiving the dynamic host configuration protocol response message returned by the dynamic host configuration protocol server, the switch may generate, according to the current address information of the virtual machine carried in the dynamic host configuration protocol response message, a binding relationship between the address information of the virtual machine and a port accessed by the virtual machine. The switch considers that all request messages for which no corresponding binding relationship is found in the binding relationships in the switch, except some types of messages such as a dynamic host configuration protocol request message, are invalid request messages, and discards the request messages, thereby ensuring security of the virtual machine of the user and avoiding access of illegal users.

Step 302: The virtual machine migrates.

The virtual machine migrates from virtual machine server 1 to virtual machine server 2.

Step 303: Virtual machine server 2 detects completion of the virtual machine migration.

Step 304: Construct a dynamic host configuration protocol request message.

After monitoring completion of the virtual machine migration, virtual machine server 2 constructs a dynamic host configuration protocol request message, where the message carries address information of the virtual machine after the migration, where the address information includes an IP address and a MAC address. The dynamic host configuration protocol request message is a unicast message. The format of the message is as follows:

| OP (1 byte) | Htype (1 byte) | hlen (1 byte) | hops (1 byte) |
|---|---|---|---|
| | Xid (4 bytes) | | |
| Secs (2 bytes) | | Flags (2 bytes) | |
| | ciaddr (4 bytes) | | |
| | yiaddr (4 bytes) | | |
| | siaddr (4 bytes) | | |
| | giaddr (4 bytes) | | |
| | chaddr (16 bytes) | | |
| | sname (64 bytes) | | |
| | file (128 bytes) | | |
| | options (64 bytes) | | |

Each filed is described as follows:

1. op: operation type of a dynamic host configuration protocol message, including a request message and a response message, 1: request message; 2: response message.

2. htype and hlen: hardware address type and length of the virtual machine.

3. hops: the number of dynamic host configuration protocol relays that the dynamic host configuration protocol message passes through. The field value increases by 1 every time the dynamic host configuration protocol request message passes through one dynamic host configuration protocol relay.

4. xid: random number selected when the virtual machine initiates a request, and used to identify an address request process.

5. secs: time after the virtual machine sends the dynamic host configuration protocol request.

6. flags: the first bit is a broadcast response flag bit, and is used to indicate whether the response message of the dynamic host configuration protocol server is sent by unicast or broadcast. Other bits are reserved.

7. ciaddr: IP address of the virtual machine.

8. yiaddr: IP address allocated by the dynamic host configuration protocol server to the virtual machine.

9. siaddr: IP address of the server from which the virtual machine obtains information such as an IP address.

10. giaddr: IP address of a first dynamic host configuration protocol relay that the request message sent by the virtual machine passes through.

11. chaddr: hardware address of the virtual machine.

12. sname: name of the server from which the virtual machine obtains information such as an IP address.

13. file: boot file name designated by the dynamic host configuration protocol server for the virtual machine.

14. options: optional variable-length option field, including configuration information such as the type of the message, a valid lease time, an IP address of a domain name system (Domain Name System, DNS) server, and an IP address of a Windows Internet Name Service (Windows Internet Name Service, WINS) server.

Step 305: Send the dynamic host configuration protocol request message.

The dynamic host configuration protocol request message is sent to the switch after the message is constructed. In this case, the switch allocates an accessed port to the virtual machine, and records the accessed port number allocated to the virtual machine. The dynamic host configuration protocol request message carrying the address information of the virtual machine after the migration is sent to the dynamic host configuration protocol server through switch 2. In a case where a dynamic host configuration protocol relay exists, switch 2 first sends the dynamic host configuration protocol request message to the dynamic host configuration protocol relay after receiving the message.

Step 306: Send the dynamic host configuration protocol request message to the dynamic host configuration protocol server.

After receiving the dynamic host configuration protocol request message carrying the address information of the virtual machine after the migration, the switch sends the message to the dynamic host configuration protocol server.

Step 307: Determine that the dynamic host configuration protocol request message is valid.

After receiving the dynamic host configuration protocol request message, the dynamic host configuration protocol server obtains the message content by parsing the request message, and determines whether the message is valid.

Step 308: Return a dynamic host configuration protocol response message.

The dynamic host configuration protocol server determines that the dynamic host configuration protocol request message is valid, and returns a dynamic host configuration protocol response message carrying the address information of the virtual machine after the migration to switch 2.

Step 309: Switch 2 obtains the address information of the virtual machine after the migration according to the dynamic host configuration protocol response message returned by the dynamic host configuration protocol server, and generates a binding relationship according to the accessed port allocated by the switch to the virtual machine in step 305.

Step 310: Return the dynamic host configuration protocol response message.

The switch returns the dynamic host configuration protocol response message to virtual machine server 2.

Step 311: Update the lease time of the IP address of the virtual machine after the migration.

The dynamic host configuration protocol response message may further include dynamic host configuration protocol lease time information in addition to the address information of the virtual machine after the migration. The lease time information is carried in an EXPIRE field of the dynamic host configuration protocol response message. According to the dynamic host configuration protocol lease time information, virtual machine server 2 may update the lease time of the IP address of the virtual machine after the migration.

Step 312: The virtual machine, as a legal user, communicates with the external network correctly.

With the method for implementing communication after virtual machine migration according to the embodiment of the present disclosure, after virtual machine server 2 detects completion of virtual machine migration, virtual machine server 2 constructs a dynamic host configuration protocol request message carrying address information of the virtual machine after the migration, so that a new binding relationship between the address information of the virtual machine after the migration and a port accessed by the virtual machine is established in the switch. Therefore, the switch can correctly identify messages sent by the virtual machine, and consider that the messages sent by the virtual machine after the migration are valid messages, thereby implementing normal communication after the virtual machine migration.

Figure 4:
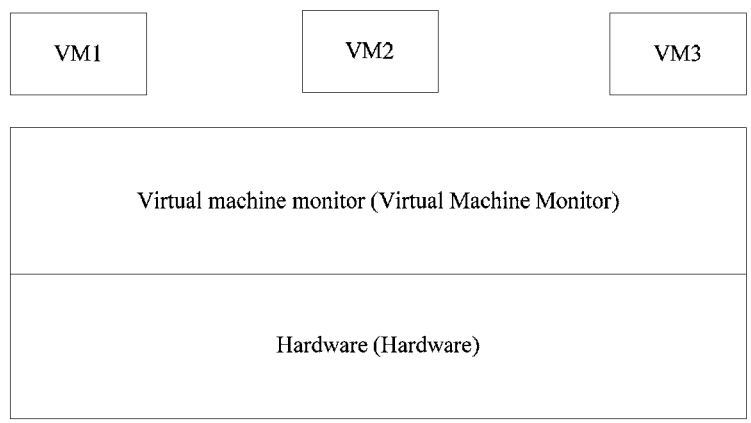
FIG. 4 is a schematic architecture diagram of a virtualization platform according to a fourth embodiment of the present disclosure.
Figure 5A:
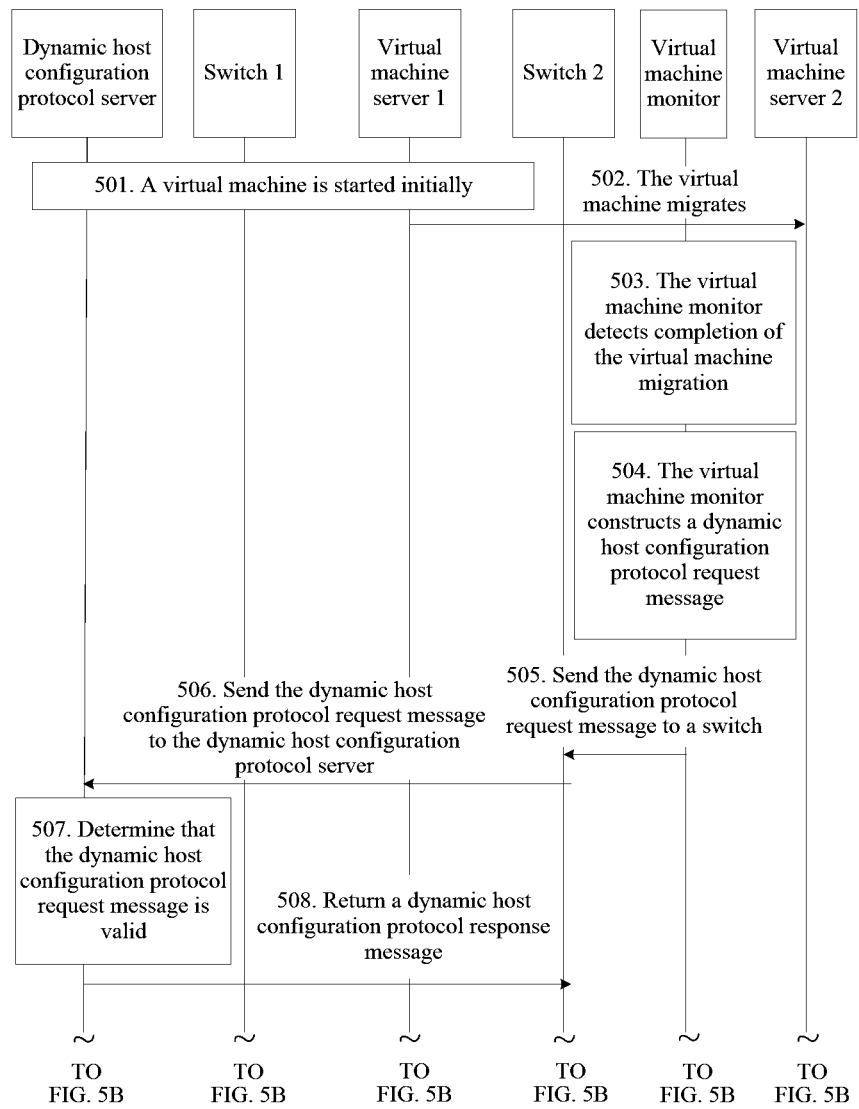
FIG. 5A and FIG. 5B are a schematic flowchart of the fourth embodiment of the present disclosure.
Figure 5B:
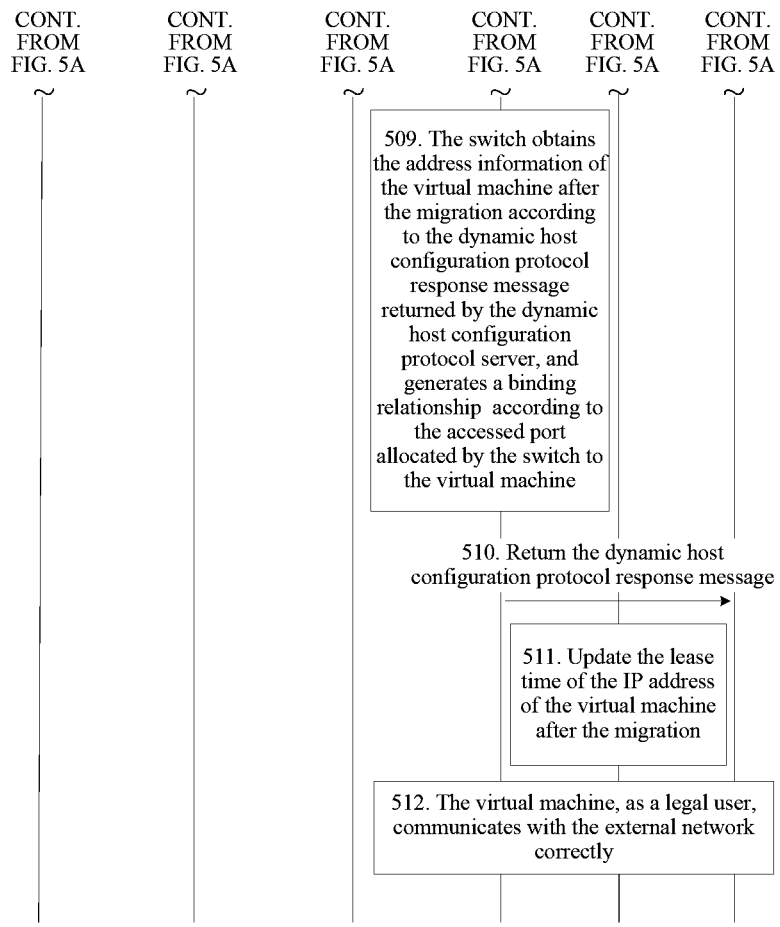

A fourth embodiment of the present disclosure provides a method for implementing communication after virtual machine migration, as shown in FIG. 4, FIG. 5A, and FIG. 5B.

As shown in the architecture in FIG. 4, after monitoring completion of virtual machine migration, a virtual machine monitor obtains address information of the virtual machine after the migration, constructs and sends a dynamic host configuration protocol request message, and performs security verification through a dynamic host configuration protocol server.

Step 501: A virtual machine is started initially.

A dynamic host configuration protocol request procedure is initiated. A switch obtains address information of a user according to the dynamic host configuration protocol response message returned by the dynamic host configuration protocol server, and generates a binding relationship according to an accessed port number allocated by the switch to the virtual machine, as shown in Table 1.

When the virtual machine is started, the virtual machine initiates a complete IP address allocation procedure. After receiving the dynamic host configuration protocol response returned by the dynamic host configuration protocol server, the switch may generate, according to the current address information of the virtual machine carried in the dynamic host configuration protocol response message, a binding relationship between the address information of the virtual machine and a port number accessed by the virtual machine, as shown in Table 1. The switch considers that all request messages for which no corresponding binding relationship is found in the binding relationships in the switch, except some types of messages such as a dynamic host configuration protocol request message, are invalid request messages, and discards the request messages, thereby ensuring security of the virtual machine of the user and avoiding access of illegal users.

Step 502: The virtual machine migrates.

The virtual machine migrates from virtual machine server 1 to virtual machine server 2.

Step 503: A virtual machine monitor detects completion of the virtual machine migration.

Step 504: Construct a dynamic host configuration protocol request message.

After monitoring completion of the virtual machine migration, the virtual machine monitor constructs a dynamic host configuration protocol request message carrying address information of the virtual machine after the migration. The dynamic host configuration protocol request message is a unicast message. The format of the message is the same as the format of the same message in the second embodiment of the present disclosure. For details, reference may be made to the description about the format of the message in the third embodiment.

Step 505: Send the dynamic host configuration protocol request message to a switch.

The dynamic host configuration protocol request message is sent to the switch after the message is constructed. In this case, the switch allocates an accessed port to the virtual machine, and records the accessed port number allocated to the virtual machine. The switch sends the message carrying the address information of the virtual machine after the migration to the dynamic host configuration protocol server. In a case where a dynamic host configuration protocol relay exists, the switch first sends the dynamic host configuration protocol request message to the dynamic host configuration protocol relay after receiving the message.

Step 506: Send the dynamic host configuration protocol request message to the dynamic host configuration protocol server.

After receiving the dynamic host configuration protocol request message carrying the address information of the virtual machine after the migration, the switch sends the message to the dynamic host configuration protocol server.

Step 507: Determine that the dynamic host configuration protocol request message is valid.

After receiving the dynamic host configuration protocol request message, the dynamic host configuration protocol server obtains the message content by parsing the request message, and determines whether the dynamic host configuration protocol request message is valid.

Step 508: Return a dynamic host configuration protocol response.

The dynamic host configuration protocol server determines that the dynamic host configuration protocol request message is valid, and returns a dynamic host configuration protocol response carrying the address information of the virtual machine after the migration to the switch.

Step 509: The switch obtains the address information of the virtual machine after the migration according to the dynamic host configuration protocol response returned by the dynamic host configuration protocol server, and generates a binding relationship according to the accessed port allocated by the switch to the virtual machine, as shown in Table 1.

Step 510: Return the dynamic host configuration protocol response. The switch returns the dynamic host configuration protocol response to the virtual machine monitor.

Step 511: Update the lease time of the IP address of the virtual machine after the migration.

The dynamic host configuration protocol response message further includes dynamic host configuration protocol lease time information in addition to the address information of the virtual machine after the migration. The lease time information is carried in an EXPIRE field of the dynamic host configuration protocol response message. According to the dynamic host configuration protocol lease time information, the lease time of the IP address of the virtual machine after the migration is updated.

Step 512: The virtual machine, as a legal user, communicates with the external network correctly.

With the method for implementing communication after virtual machine migration according to the embodiment of the present disclosure, after the virtual machine monitor detects completion of virtual machine migration, the virtual machine monitor constructs a dynamic host configuration protocol request message, and a new binding relationship between the address information of the virtual machine after the migration and a port accessed by the virtual machine is established in the switch. Therefore, the switch can correctly identify messages sent by the virtual machine, and consider that the messages sent by the virtual machine after the migration are valid messages, thereby implementing normal communication after the virtual machine migration.

Figure 6:
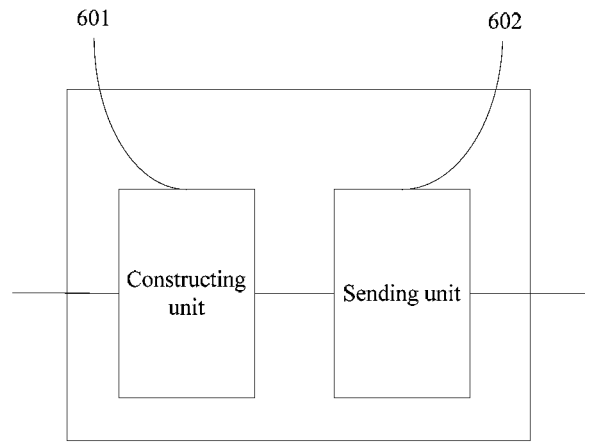
FIG. 6 is a schematic structural diagram of an apparatus for implementing communication after virtual machine migration according to a fifth embodiment of the present disclosure.

A fifth embodiment of the present disclosure provides an apparatus for implementing communication after virtual machine migration. As shown in FIG. 6, the apparatus includes a constructing unit 601 and a sending unit 602.

The constructing unit 601 is configured to construct, after migration of a virtual machine, a dynamic host configuration protocol request message carrying address information of the virtual machine after the migration. The sending unit 602 is configured to send the dynamic host configuration protocol request message to a switch, so that the switch establishes a binding relationship between the address information of the virtual machine after the migration and a port accessed by the virtual machine; where the address information includes an IP address and a MAC address.

The apparatus for implementing communication after virtual machine migration according to the embodiment of the present disclosure may further include a monitoring unit, configured to monitor the migration of the virtual machine. After the monitoring unit detects the migration of the virtual machine, the constructing unit constructs the dynamic host configuration protocol request message carrying the address information of the virtual machine after the migration.

The apparatus for implementing communication after virtual machine migration according to the embodiment of the present disclosure may be a virtual machine server or a virtual machine monitor. For details, reference may be made to the description in the method embodiments.

The apparatus for implementing communication after virtual machine migration according to the embodiment of the present disclosure may construct, after migration of a virtual machine, a dynamic host configuration protocol request message carrying address information of the virtual machine after the migration, so that the switch establishes a new binding relationship between the address information of the virtual machine after the migration and a port accessed by the virtual machine, where the address information includes an IP address and a MAC address. Therefore, the switch can correctly identify messages sent by the virtual machine, and consider that the messages sent by the virtual machine after the migration are valid messages, thereby implementing normal communication after the virtual machine migration.

Figure 7:
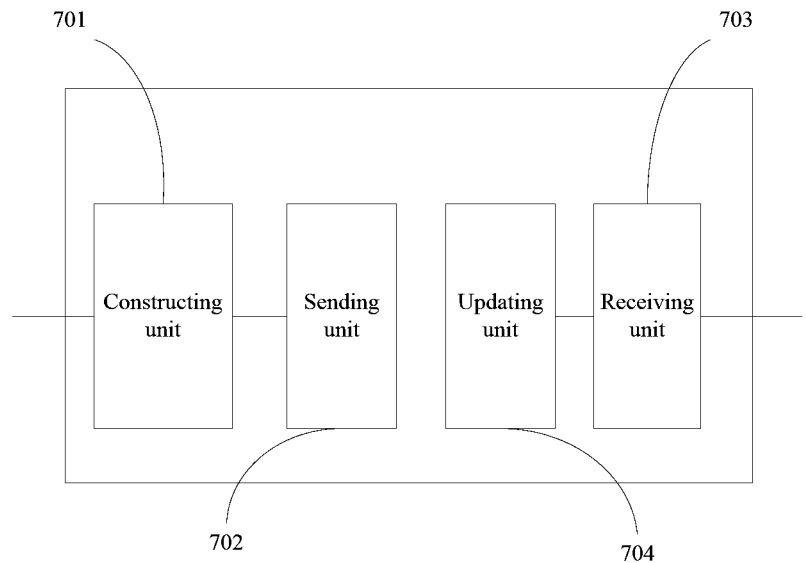
FIG. 7 is a schematic structural diagram of an apparatus for implementing communication after virtual machine migration according to a sixth embodiment of the present disclosure.

A sixth embodiment of the present disclosure provides an apparatus for implementing communication after virtual machine migration. As shown in FIG. 7, the apparatus includes a constructing unit 701, a sending unit 702, a receiving unit 703, and an updating unit 704.

The constructing unit 701 is configured to construct a dynamic host configuration protocol request message carrying address information of a virtual machine after the migration. The sending unit 702 is configured to send the dynamic host configuration protocol request message to a switch, so that the switch establishes a binding relationship between the address information of the virtual machine after the migration and a port accessed by the virtual machine; where the address information includes an IP address and a MAC address. The receiving unit 703 is configured to receive a dynamic host configuration protocol response message that is sent by the switch and carries the address information of the virtual machine after the migration. The updating unit 704 is configured to update, according to the dynamic host configuration protocol response message, a lease time of the IP address of the virtual machine after the migration.

The apparatus for implementing communication after virtual machine migration according to the embodiment of the present disclosure may further include a detecting unit, configured to detect the migration of the virtual machine. After the detecting unit detects the migration of the virtual machine, the constructing unit constructs the dynamic host configuration protocol request message carrying the address information of the virtual machine after the migration.

The apparatus for implementing communication after virtual machine migration according to the embodiment of the present disclosure may be a virtual machine server or a virtual machine monitor.

The apparatus for implementing communication after virtual machine migration according to the embodiment of the present disclosure may construct, after detecting completion of virtual machine migration, a dynamic host configuration protocol request message carrying address information of the virtual machine after the migration, where the address information includes an IP address and a MAC address; a new binding relationship between the address information of the virtual machine after the migration and a port accessed by the virtual machine is established in the switch, and the lease time of the IP address after the virtual machine migration is updated. Therefore, the switch can correctly identify, within the lease time of the IP address after the virtual machine migration, messages sent by the virtual machine, and consider that the messages sent by the virtual machine after the migration are valid messages, thereby implementing normal communication after the virtual machine migration.

Figure 8:
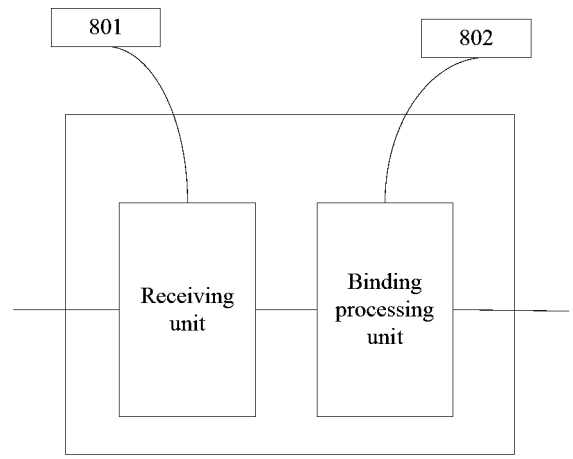
FIG. 8 is a schematic structural diagram of a switch for implementing communication after virtual machine migration according to a seventh embodiment of the present disclosure.

A seventh embodiment of the present disclosure provides a switch for implementing communication after virtual machine migration. As shown in FIG. 8, the switch includes a receiving unit 801 and a binding processing unit 802.

The receiving unit 801 is configured to receive, after migration of a virtual machine, a dynamic host configuration protocol request message carrying address information of the virtual machine after the migration. The binding processing unit 802 is configured to establish a binding relationship between the address information of the virtual machine after the migration and a port accessed by the virtual machine; where the address information includes an IP address and a MAC address.

The switch in the embodiment of the present disclosure may further include a sending unit and an obtaining unit. The sending unit is configured to send the dynamic host configuration protocol request message to a dynamic host configuration protocol server, so that the dynamic host configuration protocol server verifies validity of the dynamic host configuration protocol request message. If the verification succeeds, the receiving unit 801 is further configured to receive a dynamic host configuration protocol response message that is returned by the dynamic host configuration protocol server and carries the address information of the virtual machine after the migration. The obtaining unit is configured to obtain, from the dynamic host configuration protocol response message, the address information of the virtual machine after the migration.

The switch for implementing communication after virtual machine migration may further include a port allocating unit, configured to allocate an accessed port to the virtual machine and record the accessed port number allocated to the virtual machine.

The obtaining unit may further obtain, from the port allocating unit, the port accessed by the virtual machine. The establishing, by the binding processing unit 802, the binding relationship between the address information of the virtual machine after the migration and the port accessed by the virtual machine specifically includes: establishing the binding relationship according to the address information of the virtual machine after the migration which is obtained from the dynamic host configuration protocol response message and the port accessed by the virtual machine, as shown in Table 1.

The sending unit in the embodiment of the present disclosure is further configured to send the dynamic host configuration protocol response message carrying the address information of the virtual machine after the migration to a virtual machine server or a virtual machine monitor, so that a lease time of the IP address of the virtual machine after the migration is updated.

In the switch provided by the embodiment of the present disclosure, the receiving unit receives a dynamic host configuration protocol request message carrying address information of a virtual machine after migration, and the binding processing unit establishes a binding relationship between the address information of the virtual machine after the migration and a port accessed by the virtual machine, where the address information includes an IP address and a MAC address. Therefore, the switch can correctly identify messages sent by the virtual machine, and consider that the messages sent by the virtual machine after the migration are valid messages, thereby implementing normal communication after the virtual machine migration.

Figure 9:
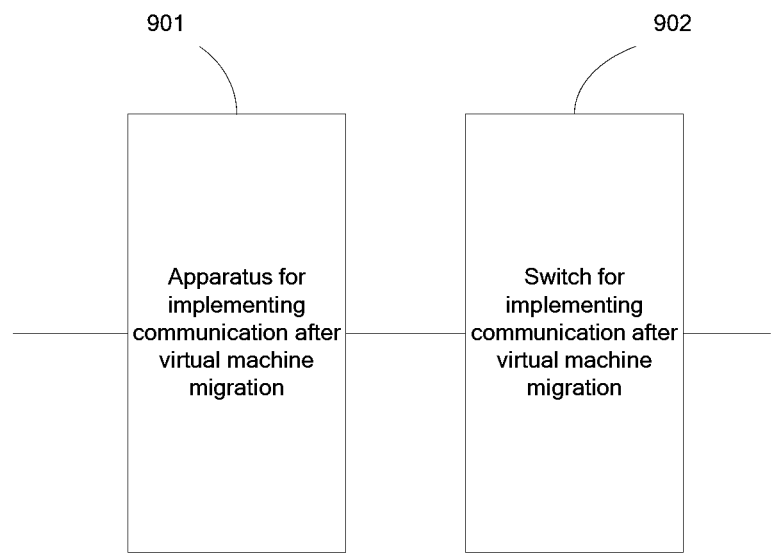
FIG. 9 is a schematic structural diagram of a system for implementing communication after virtual machine migration according to an eighth embodiment of the present disclosure.

An eighth embodiment of the present disclosure provides a system for implementing communication after virtual machine migration. As shown in FIG. 9, the system includes an apparatus 901 for implementing communication after virtual machine migration and a switch 902 for implementing communication after virtual machine migration. The apparatus 901 for implementing communication after virtual machine migration is configured to construct, after migration of a virtual machine, a dynamic host configuration protocol request message carrying address information of the virtual machine after the migration, and send the dynamic host configuration protocol request message to the switch 902. The switch 902 receives the dynamic host configuration protocol request message carrying the address information of the virtual machine after the migration, and establishes a binding relationship between the address information of the virtual machine after the migration and a port accessed by the virtual machine, as shown in Table 1, where the address information includes an IP address and a MAC address.

The apparatus 901 for implementing communication after virtual machine migration in the embodiment of the present disclosure may be a virtual machine server or a virtual machine monitor.

In the system for implementing communication after virtual machine migration according to this embodiment, the apparatus for implementing communication after virtual machine migration constructs, after migration of a virtual machine, a dynamic host configuration protocol request message carrying address information of the virtual machine after the migration, and the switch obtains the address information of the virtual machine after the migration from a dynamic host configuration protocol response message, and establishes a binding relationship between the address information of the virtual machine after the migration and a port accessed by the virtual machine. Therefore, the switch can correctly identify messages sent by the virtual machine, and consider that the messages sent by the virtual machine after the migration are valid messages, thereby implementing normal communication after the virtual machine migration.

Figure 10:
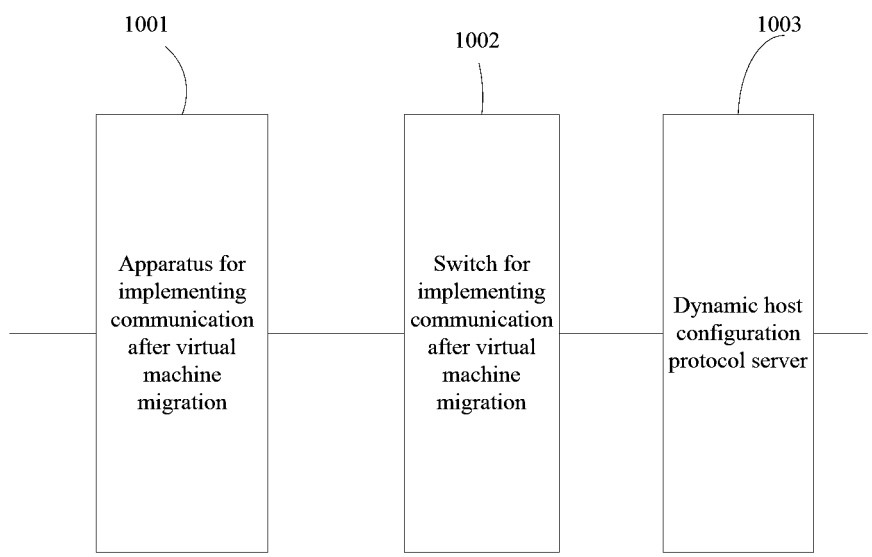
FIG. 10 is a schematic structural diagram of a system for implementing communication after virtual machine migration according to a ninth embodiment of the present disclosure.

A ninth embodiment of the present disclosure provides a system for implementing communication after virtual machine migration. As shown in FIG. 10, the system includes an apparatus 1001 for implementing communication after virtual machine migration, a switch 1002 for implementing communication after virtual machine migration, and a dynamic host configuration protocol server 1003. The apparatus 1001 for implementing communication after virtual machine migration is configured to construct, after migration of a virtual machine, a dynamic host configuration protocol request message carrying address information of the virtual machine after the migration, and send the dynamic host configuration protocol request message to the switch 1002. The switch 1002 is configured to receive the dynamic host configuration protocol request message which is constructed and sent by the apparatus 1001 for implementing communication after virtual machine migration and carries the address information of the virtual machine after the migration, and send the dynamic host configuration protocol request message to the dynamic host configuration protocol server 1003 for verification, and if the verification succeeds, receive a dynamic host configuration protocol response message that is returned by the dynamic host configuration protocol server 1003 and carries the address information of the virtual machine after the migration, and establish a binding relationship between the address information of the virtual machine after the migration and a port accessed by the virtual machine, as shown in Table 1, where the address information includes an IP address and a MAC address.

The dynamic host configuration protocol server 1003 is configured to receive and verify the dynamic host configuration protocol request message, and if the verification succeeds, return the dynamic host configuration protocol response message carrying the address information of the virtual machine after the migration to the switch 1002.

The apparatus 1001 for implementing communication after virtual machine migration in the embodiment of the present disclosure may be a virtual machine server or a virtual machine monitor.

For the system in the eighth and ninth embodiments of the present disclosure, reference may be made to the description about the apparatus in the fourth to seventh embodiments.

In the system provided by this embodiment, the apparatus for implementing communication after virtual machine migration constructs, after migration of a virtual machine, a dynamic host configuration protocol request message carrying address information of the virtual machine after the migration and sends the request message to the dynamic host configuration protocol server through the switch; the dynamic host configuration protocol server returns a dynamic host configuration protocol response message if the verification succeeds; the switch obtains the address information of the virtual machine after the migration from the dynamic host configuration protocol response message, and establishes a binding relationship between the address information of the virtual machine after the migration and a port accessed by the virtual machine. Therefore, the switch can correctly identify messages sent by the virtual machine, and consider that the messages sent by the virtual machine after the migration are valid messages, thereby implementing normal communication after the virtual machine migration.

The apparatus embodiments and system embodiments in the embodiments of the present disclosure based on the same idea as the method embodiments of the present disclosure. For details, reference may be made to the method embodiments.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to the corresponding process in the foregoing method embodiments, and the details will not be described herein again.

In the several embodiments provided in the present disclosure, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present disclosure. The foregoing storage medium includes: any non-transit storage medium that can store program code, such as a USB flash drive, a removable hard disk, a read-only memory (Read-Only Memory, ROM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for implementing communication after virtual machine migration, comprising:
constructing, after migration of a virtual machine, a dynamic host configuration protocol request message for requesting a lease from a dynamic host configuration protocol server including address information of the virtual machine after the migration; and
sending the dynamic host configuration protocol request message to a switch, to enable the switch to establish a binding relationship between the address information of the virtual machine after the migration and a port accessed by the virtual machine after the dynamic host configuration protocol server verifies validity of the dynamic host configuration protocol request message; wherein the address information comprises an IP address allocated by the dynamic host configuration protocol server and a MAC address.

2. The method according to claim 1, wherein the dynamic host configuration protocol request message is constructed after a virtual machine server or a virtual machine monitor detects the migration of the virtual machine.

3. The method according to claim 1, wherein the method further comprises:
receiving a dynamic host configuration protocol response message from the switch and which includes the address information of the virtual machine after the migration; and
updating, according to the dynamic host configuration protocol response message, a lease time of the IP address of the virtual machine after the migration.

4. The method according to claim 1, wherein the dynamic host configuration protocol request message is a unicast renewal request message.

5. A method for implementing communication after virtual machine migration, comprising:
receiving, by a switch after migration of a virtual machine, a dynamic host configuration protocol request message for requesting a lease from a dynamic host configuration protocol server including address information of the virtual machine after the migration; and
sending the dynamic host configuration protocol request message to a dynamic host configuration protocol server, to enable the dynamic host configuration protocol server to verify validity of the dynamic host configuration protocol request message;
receiving a dynamic host configuration protocol response message from the dynamic host configuration protocol server and which includes the address information of the virtual machine after the migration; and
obtaining, from the dynamic host configuration protocol response message, the address information of the virtual machine after the migration;
establishing, by the switch, a binding relationship between the address information of the virtual machine after the migration and a port accessed by the virtual machine; wherein the address information comprises an IP address allocated by the dynamic host configuration protocol server and a MAC address.

6. The method according to claim 5, wherein: the method further comprises: obtaining the port accessed by the virtual machine.

7. The method according to claim 6, wherein:
the method further comprises: allocating, by the switch, the port accessed by the virtual machine to the virtual machine, and recording the port number accessed by the virtual machine.

8. The method according to claim 5, wherein the method further comprises: sending, by the switch, the dynamic host configuration protocol response message including the address information of the virtual machine after the migration to a virtual machine server or a virtual machine monitor, so that a lease time of the IP address of the virtual machine after the migration is updated.

9. The method according to claim 5, wherein the dynamic host configuration protocol request message is a unicast renewal request message.

10. An apparatus for implementing communication after virtual machine migration, comprising a processor and an interface, wherein:
the processor, configured to construct, after migration of a virtual machine, a dynamic host configuration protocol request message for requesting a lease from a dynamic host configuration protocol server including address information of the virtual machine after the migration; and
the interface, configured to send the dynamic host configuration protocol request message to a switch, to enable the switch to establish a binding relationship between the address information of the virtual machine after the migration and a port accessed by the virtual machine after the dynamic host configuration protocol server verifies validity of the dynamic host configuration protocol request message;
wherein the address information comprises an IP address allocated by the dynamic host configuration protocol server and a MAC address.

11. The apparatus according to claim 10, wherein:
the processor is further configured to monitor the migration of the virtual machine.

12. The apparatus according to claim 10, wherein:
the interface is further configured to receive a dynamic host configuration protocol response message from the switch and which includes the address information of the virtual machine after the migration; and
the processor is further configured to update, according to the dynamic host configuration protocol response message, a lease time of the IP address of the virtual machine after the migration.

13. A switch for implementing communication after virtual machine migration, comprising a processor and a port, wherein:
the port, configured to receive, after migration of a virtual machine, a dynamic host configuration protocol request message for requesting a lease from a dynamic host configuration protocol server including address information of the virtual machine after the migration, send the dynamic host configuration protocol request message to a dynamic host configuration protocol server, to enable the dynamic host configuration protocol server to verify validity of the dynamic host configuration protocol request message, and receive a dynamic host configuration protocol response message from the dynamic host configuration protocol server and which includes the address information of the virtual machine after the migration; and the processor, configured to obtain, from the dynamic host configuration protocol response message, the address information of the virtual machine after the migration, establish a binding relationship between the address information of the virtual machine after the migration and the port accessed by the virtual machine;

wherein the address information comprises an IP allocated by the dynamic host configuration protocol server address and a MAC address.

14. The switch according to claim 13, wherein:
the processor is configured to obtain the port accessed by the virtual machine.

15. The switch according to claim 14, wherein:
the processor is configured to allocate the port to the virtual machine, and record the port number allocated to the virtual machine.

16. The switch according to claim 13, wherein the port is further configured to send the dynamic host configuration protocol response message including the address information of the virtual machine after the migration to a virtual machine server or a virtual machine monitor, so that a lease time of the IP address of the virtual machine after the migration is updated.

17. A system for implementing communication after virtual machine migration, comprising:
an apparatus for implementing communication after virtual machine migration, the apparatus comprising:
a computing hardware; and
a non-transitory computer readable medium including computer executable instructions that, when executed by the computing hardware cause the system to construct, after migration of a virtual machine, a dynamic host configuration protocol request message for requesting a lease from a dynamic host configuration protocol server including address information of the virtual machine after the migration, and send the dynamic host configuration protocol request message to a switch; and the switch comprising a port, a processor and a non-transitory computer readable medium including computer executable instructions that, when executed by the processor, cause the switch to receive the dynamic host configuration protocol request message including the address information of the virtual machine after the migration, send the dynamic host configuration protocol request message to a dynamic host configuration protocol server, to enable the dynamic host configuration protocol server to verify validity of the dynamic host configuration protocol request message, receive a dynamic host configuration protocol response message from the dynamic host configuration protocol server and which includes the address information of the virtual machine after the migration, obtain, from the dynamic host configuration protocol response message, the address information of the virtual machine after the migration, and establish a binding relationship between the address information of the virtual machine after the migration and the port accessed by the virtual machine;

wherein the address information comprises an IP address allocated by the dynamic host configuration protocol server and a MAC address.

* * * * *